United States Patent
Langer et al.

(10) Patent No.: US 8,444,322 B2
(45) Date of Patent: May 21, 2013

(54) FACE SPLINE FOR A DRIVEN WHEEL HUB

(75) Inventors: Roland Langer, Schwanfeld (DE);
Peter Niebling, Bad Kissingen (DE);
Ernst Masur, Untereuerheim (DE); Ralf Heiss, Schweinfurt (DE); Benno Fueller, Karlstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 733 days.

(21) Appl. No.: 11/817,590

(22) PCT Filed: Feb. 24, 2006

(86) PCT No.: PCT/DE2006/000340
§ 371 (c)(1),
(2), (4) Date: Nov. 7, 2007

(87) PCT Pub. No.: WO2006/092119
PCT Pub. Date: Sep. 8, 2006

(65) Prior Publication Data
US 2008/0175526 A1 Jul. 24, 2008

(30) Foreign Application Priority Data
Mar. 4, 2005 (DE) .......................... 10 2005 009 938

(51) Int. Cl.
*F16C 13/00* (2006.01)
(52) U.S. Cl.
USPC .......................................... 384/544; 384/589
(58) Field of Classification Search
USPC ....... 384/504, 510, 537, 544, 589; 301/105.1;
464/178, 906; 403/97, 359.1, 359.6
See application file for complete search history.

(56) References Cited

U.S. PATENT DOCUMENTS

| | | | |
|---|---|---|---|
| 4,047,770 A | 9/1977 | Korenhof et al. | |
| 4,440,256 A * | 4/1984 | Palmer | 180/254 |
| 4,460,058 A * | 7/1984 | Welschof et al. | 180/258 |
| 4,744,263 A * | 5/1988 | Kuiken | 74/462 |
| 4,893,960 A * | 1/1990 | Beier et al. | 403/24 |
| 5,806,936 A * | 9/1998 | Guimbretiere | 301/105.1 |
| 5,845,533 A * | 12/1998 | Basstein et al. | 74/462 |
| 6,146,022 A | 11/2000 | Sahashi et al. | |
| 6,193,320 B1 * | 2/2001 | Weiss | 301/35.63 |
| 7,597,405 B2 * | 10/2009 | Langer et al. | 301/105.1 |

FOREIGN PATENT DOCUMENTS

| | | |
|---|---|---|
| DE | 440816 A | 2/1927 |
| DE | 30 14 446 A1 | 10/1980 |
| DE | 31 16 720 A | 10/1982 |
| DE | 36 36 243 A | 5/1988 |

(Continued)

OTHER PUBLICATIONS

"Spur Gear Terms & Calculations", May 8, 2008, http://shopswarf.oreonhosting.net.nz/spur.html, p. 1.*

(Continued)

*Primary Examiner* — James Pilkington
(74) *Attorney, Agent, or Firm* — Lucas & Mercanti, LLP (57) ABSTRACT

A face spline of a toothed rim running in a circumferential direction around a rotation axis on a wheel-bearing arrangement for a driven wheel hub. The face spline is provided for play-free engagement with the counter-spline, facing the face spline and the teeth of the face spline have a wedge-like embodiment such that the geometrical lines of the face spline meet centrally at a common point on the rotation axis and the teeth thus run in the radial direction on the rotation axis.

6 Claims, 4 Drawing Sheets

FOREIGN PATENT DOCUMENTS

| | | |
|---|---|---|
| DE | 296 16 818 U1 | 1/1998 |
| DE | 200 20 455 U1 | 2/2001 |
| EP | 1853436 A1 | 11/2007 |
| GB | 824 931 A | 12/1959 |

OTHER PUBLICATIONS

G. Niemann; H. Winter; B.-R. Hoehn (2005 Maschinenelemente, Band 1: Kontruction ud Berechnung von Verbindungen, Lagern, Wellen; Springer-Verlag GmbH; p. 403, Fig. 10.14; paragraph 10.4. 4.4; p. 406, fig. 10.16 a,b.

Brochure Voith Turbo GmbH & Co. KG "Voith-Hirth-Stirnverzahnung" Jul. 2003.

Brochure Voith Turbo GmbH & Co. KG "Voith-Hirth-Stirnverzahnung, Normringe and Zahnringe" Jun. 2007.

Kessel, S. "Skriptum zur Vorlesung Mechanik I fuer Studierende des Maschinenbaus" Lehrstuhl fuer Mechanik—Universitaet Dortmund; 1997.

Braun, M. "Technische Mechanik I" Wintersemester 2001/2002, Jan. 30, 2004.

SEW Eurodrive "Antriebe projektieren"; Oct. 2001.

Niemann, G; Winter, H; Hoehn B.-H. "Machinenelemente Band 1: Konstruktion and Berechnung von Verbindungen, Lagern, Wellen" Springer-Verlag GmbH; p. 403, fig. 10.14; p. 404, paragraph 10.4.4. 4; p. 406, fig. 10.16 a,b.

* cited by examiner

FACE SPLINE FOR A DRIVEN WHEEL HUB

This application is a 371 of PCT/DE2006/00340 filed Feb. 24, 2006, which in turn claims the priority of DE 10 2005 009 938.6 filed Mar. 4, 2005, the priority of both applications is hereby claimed and both applications are incorporated by reference herein.

FIELD OF THE INVENTION

The invention relates to a face spline of a toothed rim which extends about a rotational axis in the circumferential direction on a wheel bearing arrangement for a driven wheel hub, the face spline being provided for playfree engagement into the mating spline which faces the face spline, and the teeth of the face spline being of wedge-shaped configuration in such a way that the geometric lines of the face spline meet centrally at a common point on the rotational axis and the teeth therefore extend in the radial direction toward the rotational axis.

BACKGROUND OF THE INVENTION

A face spline of this type is described in further detail in DE 31 16 720 C1. A corresponding mating spline of a drive shaft of the vehicle engages into the face spline. The mating spline is formed as a rule on a bell or a stub of a bell of a constant velocity joint.

During the assembly of the drive element into the wheel hub arrangement, the drive element and the wheel hub self center with respect to one another with regard to the rotational axis on account of the geometry of the radial serrations. A high accuracy of true running at the connection is therefore ensured during driving operation. The assembly of the joint part to the hub is on the one hand simple on account of the self centering, but on the other hand requires a very high axial prestressing force.

The flanks of all the teeth of the face spline are in engagement with both flanks of all the teeth of the mating spline. The splines are clamped axially by means of one or more screw elements. Torques are transmitted to the wheel hub by a force-transmitting and form-fitting connection which is produced from surface pressure.

The connection of the joint part to a wheel hub is of advantage, in particular, when high moments are to be transmitted from the drive to the wheel or, possibly, in a reverse flow of moments. The pairs of inner splines and outer splines which are usually used are often exhausted in terms of installation space and therefore with regard to the strength, so that the face spline is a reliable and installation space saving alternative to the former. The rigid configuration for transmitting high torques to the wheel can have a disadvantageous effect when, in the case of overloading, a fracture of the wheel hub, in the most unfavorable case, leads to the loss of the vehicle wheel.

SUMMARY OF THE INVENTION

It is therefore the object of the invention to provide a face spline, by way of the design of which the above-mentioned disadvantages are avoided.

This object is achieved in that the flanks of the teeth of the face spline which are provided for the engagement are each inclined at a flank angle greater than 20° and smaller than 30°. In the case of a symmetrically configured spline, the flank angle is half of the tooth angle. The flanks are inclined at the flank angle with respect to an imaginary pitch plane which leads away from the rotational axis.

In wheel bearings, limits are placed on the dimensions and changes to the dimensions of face splines for reasons of installation space. The pitch circle diameter (mean circumference of the face spline about the rotational axis) of the spline is accordingly stipulated within very narrow limits as a rule. Accordingly, the behavior of the spline, for example with respect to loadings from the drive torques, can barely be influenced or cannot be influenced by changes in the pitch circle of the spline. The geometry of the individual teeth of the spline is influenced via the flank angle by way of the invention in such a way that an optimum number of teeth can be fixed on a predefined circumference with regard to the assembly and with regard to the loadings from torques. The flank angle of the active flanks which are in playfree engagement with the mating spline is preferably 22.5°. As a result of this design, the prestressing forces during assembly are kept low on account of the relatively low axial force components in the spline. The cross section of each individual tooth at the tooth root is configured in such a way that the face spline transmits high torques during nominal operation, but yields at a predefined fracture moment.

There is provision with one refinement of the invention for tooth gaps of the face spline to be rounded concavely with at least one root radius at least between in each case two of the flanks which lie opposite one another at the tooth gap (from flank to flank), and for the tooth tip of the respective tooth to be rounded with at least one convex tip radius at least from one flank to the other flank of the respective tooth. Moreover, there is provision for the tip radius to always be greater than the root radius. On account of this, the tooth tip of the mating spline does not come into contact with the base of the tooth gap of the face spline, and the tooth tip of the face spline does not come into contact with the base of the tooth gap of the mating spline. It is ensured that the active flanks bear against one another without play. The face spline and the mating spline according to the invention can be of identical configuration. If the spline is preferably introduced without cutting by forming with what are known as snap die tools, the same tool can be used for both splines.

Moreover, the magnitude of the radii influences the height of the teeth of the face spline and therefore the resistance of the spline to loadings. Refinements of the invention therefore provide for a quotient from the greatest theoretical tooth height of the respective tooth and the tip radius to be at least the number five and at most the number nine:

$$5 \leq H_{th}/R \leq 9.$$

In the symmetrical or pitch plane, the theoretical tooth height is the greatest axial spacing between the first cut edge in the tip plane and the second cut edge in the root plane of the tooth. In each case two mutually facing geometric planes meet one another in the cut edges, which geometric planes describe at least that part of the flanks which is in engagement with the mating spline. Accordingly, the geometric planes of the flanks of one tooth which enclose twice the flank angle between them on the tooth tip side meet in the first cut section. The geometric planes of in each case two flanks of mutually adjacent teeth, which flanks lie opposite one another at in each case one tooth gap, meet on the tooth root side in the second cut edge.

At the same time or as an alternative, a quotient from the greatest theoretical tooth height of the respective tooth and the root radius is at least the number seven and at most the number eleven:

$$7 \leq H_{th} \leq 11.$$

At the same time or as an alternative, the quotient of the greatest theoretical tooth height of the respective tooth and the theoretical tooth root width is at least the value 0.9 and at most the value 1.3:

$$0.9 \leq H_{th}/B_{th} \leq 1.3.$$

The theoretical tooth root width is in each case the spacing between two mutually adjacent cut edges on the tooth root side.

By way of the above-mentioned geometry, a predetermined breaking point is provided in the face spline on the wheel hub bearing in the torque connection between the joint shaft and the wheel, which predetermined breaking point is arranged away from parts which are relevant to safety, for example in a manner which is remote from the wheel bearing. As a result, the overall cross section of the material of the face spline, which overall cross section is loaded by torques about the rotational axis, has a lower resistance to deformations, which lower resistance leads to yielding deformation of the spline in a targeted manner in the case of torques which are produced by overloading. Each further cross section of the material of the wheel hub which is loaded by the same torques and is remote from the face spline has higher section moduli. The overall cross section is the sum of all the individual cross sections of the teeth, tooth roots and/or cross sections in the material of the wheel hub at the transitions to the teeth, which individual cross sections are loaded proportionally by torques at the same time with the action of the respective overall torque. Therefore, in the case of overloading, in the worst case the drive to the wheel hub is interrupted by destruction of the tooth engagement, but the wheel bearing remains intact.

As an alternative, the pair comprising the face splines is designed as a safety ratchet coupling. The wheel hub and the drive element are clamped axially with prestress against one another by means of at least one threaded bolt. Overall or at each arbitrary section/cross section of its material, but in all cases at the weakest point of at least one arbitrary cross section, the threaded bolt has a lower resistance to deformation as a result of loadings from torques than any arbitrary section of the wheel bearing unit which is loaded by the torques or by forces which result from the torques. This measure is active, in particular, in those cases, in which the face spline or the pair is of such rigid configuration on account of the large pitch circle diameter that it is not suitable as a predetermined breaking point.

A central bolt or a plurality of bolts which are arranged about the rotational axis have an overall cross section which is designed according to the magnitude of the required fracture moment. In the case of overloadings, torques which act on the spline are converted in the spline into axial forces on account of the flank geometry according to the invention, which axial forces expand the bolt axially to such an extent that the tooth flanks rise up on one another and finally detach from one another, with the result that the rotationally fixed connection is canceled. The threaded bolt can be deformed axially at least elastically but also plastically in a yielding manner in such a way that it has a lower resistance to plastic and elastic deformation at least in the axial direction than an overall cross section of the spline which is loaded at the same time by the axial prestress and the torques. The resistance is an axial force on the screw connection which is smaller than or equal to an axial release force, at which the splines which engage with one another begin to be released from one another counter to the prestressing force.

It is also conceivable to realize a combination of the predetermined breaking point in the face spline and an expanding element bolt on the face spline.

In this invention, resistance is to be understood as the ability of a flat section of the material to resist loadings from bending (section modulus, torsion, tension and compression). The loadings are first of all introduced as a moment about the rotational axis and are then converted at the spline into axial and tangential force components.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
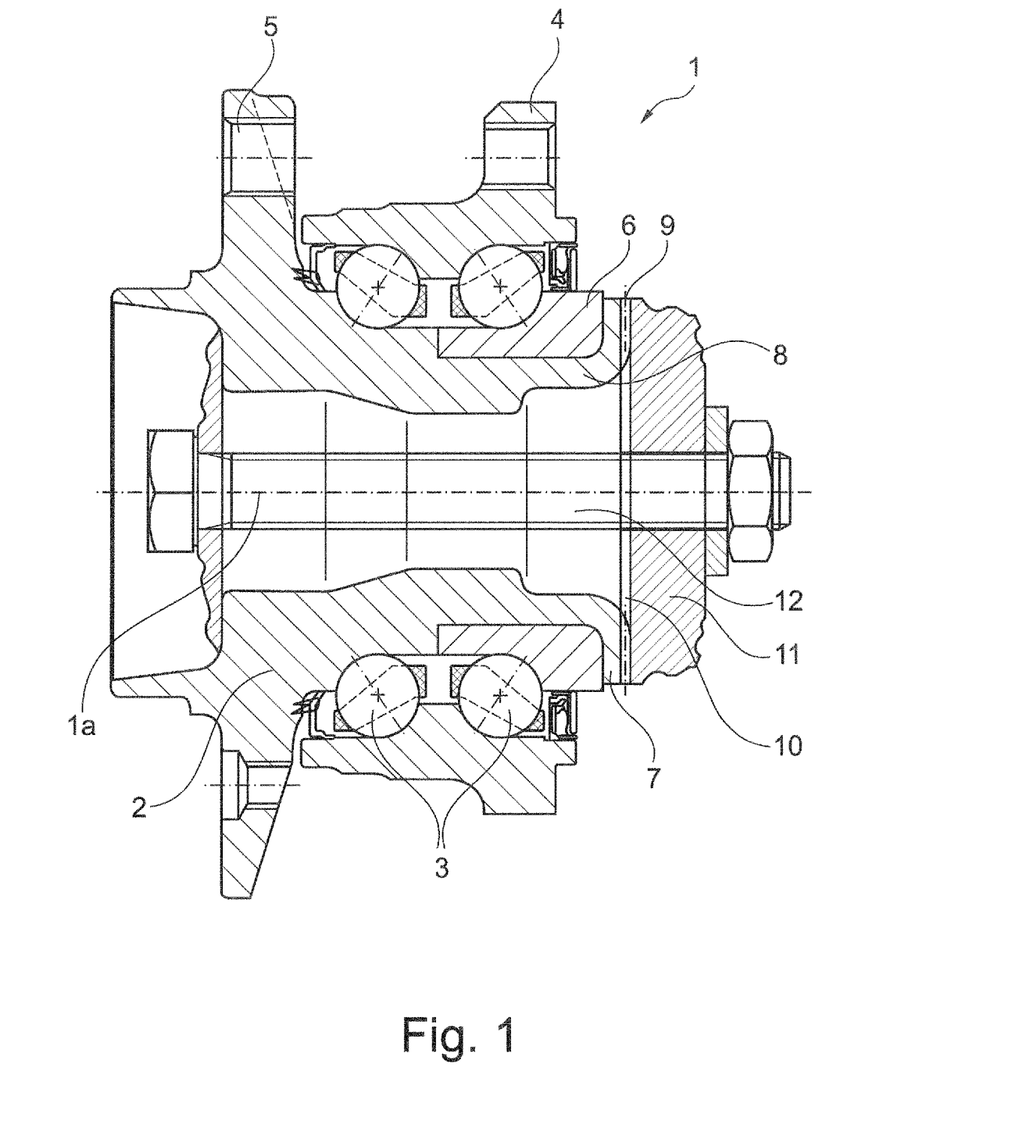
FIG. 1 is a cross-sectional view of a wheel bearing arrangement.

FIG. 1 shows a wheel bearing arrangement 1 having a wheel hub 2, two rows of rolling bodies 3 and a vehicle flange 4. The wheel hub 2 has a flange 5 for fastening a vehicle wheel (not shown) and is mounted via the rolling bodies 3 such that it can rotate about the rotational axis 1a with respect to the vehicle flange 4 which is fixed to the vehicle. An inner ring 6 is seated on the wheel hub 2, on which inner ring 6 a row of the rolling bodies 3 runs. The inner ring 6 is held axially on the wheel hub 2 by means of a collar 7. Moreover, the angular contact ball bearing arrangement is prestressed by means of the collar 7. The collar 7 is configured integrally with a hollow section 8 of the wheel hub 2 and is folded over radially to the outside from the latter.

One exemplary embodiment of a face spline 9 according to the invention is made in that side of the collar 7 which faces in the axial direction without cutting by forming, such as cold extrusion, stamping or rolling. The face spline is paired with a corresponding mating spline 10 on a drive element 11 (not shown in further detail). The splines 9 and 10 have the same number of teeth 13 as one another, face one another axially, engage without play into one another and are clamped axially inside one another and against one another by means of a threaded bolt 12.

Figure 2:
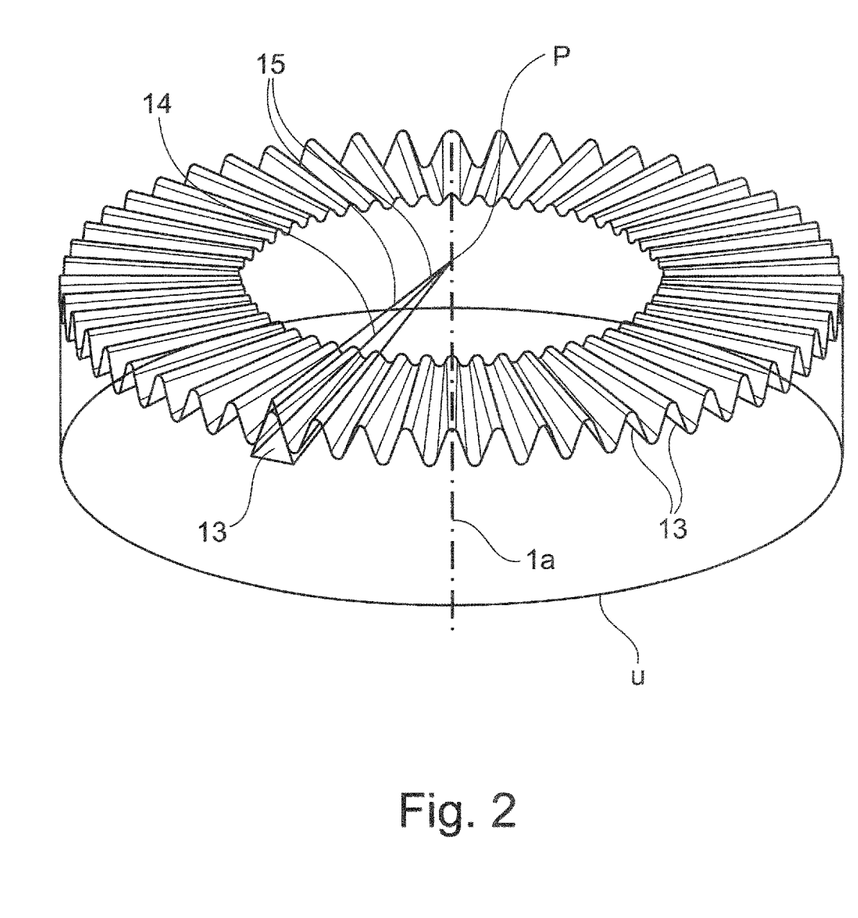
FIG. 2 is perspective view of a face spline.
Figure 2A:
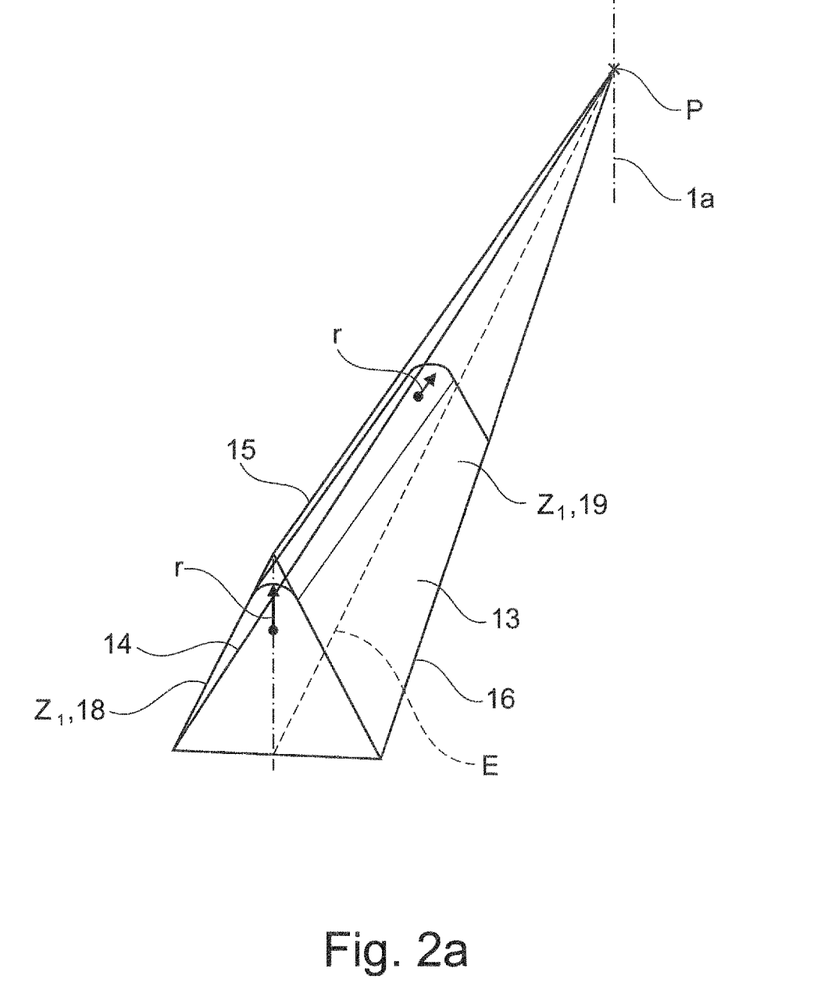
FIG. 2a is perspective view of a tooth of the face spline.
Figure 3:
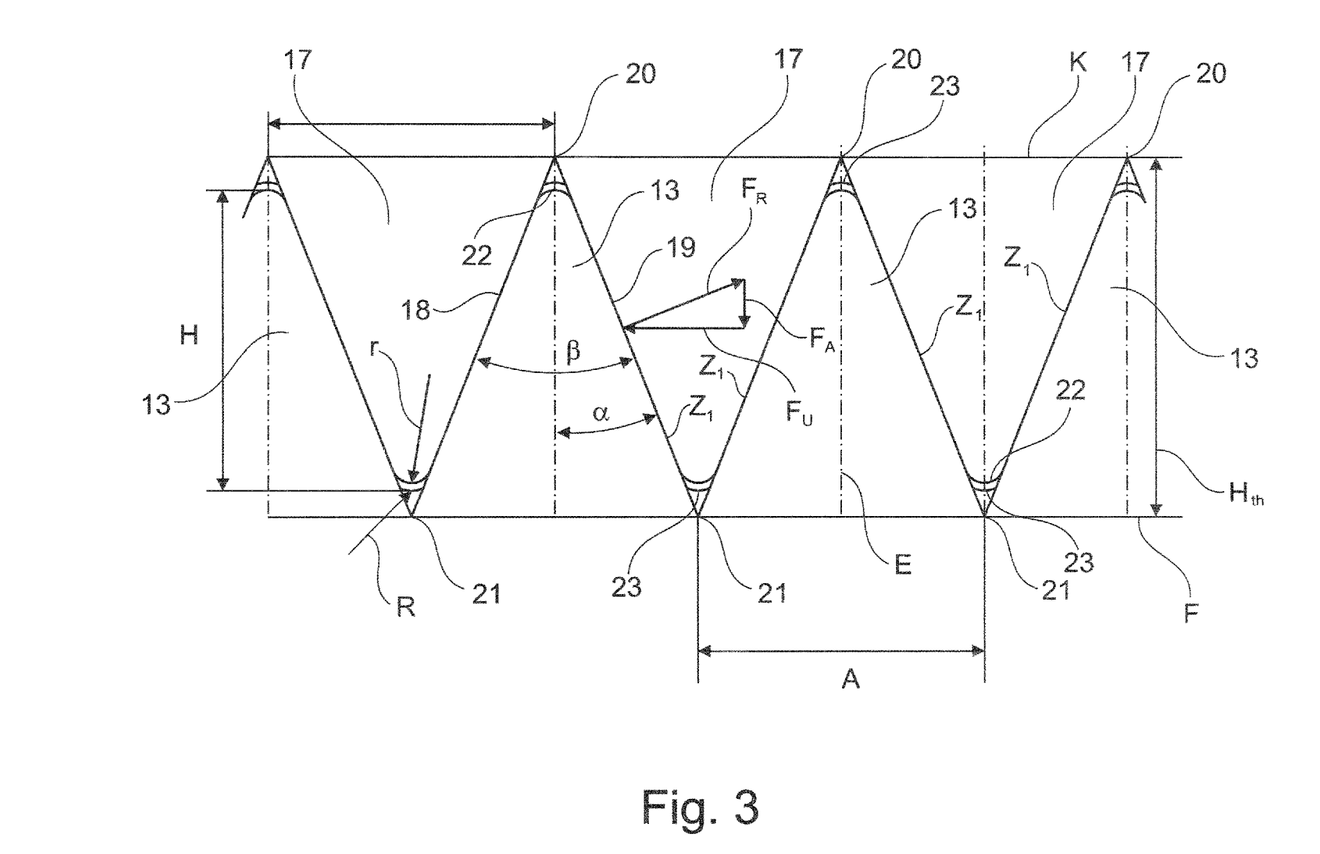
FIG. 3 is a cross-sectional view of the teeth of the face spline.

Exemplary embodiments of the splines 9 and 10 are shown in simplified form in FIGS. 2, 2a and 3. FIG. 2 shows the spline 9, 10 in perspective and also shows here how the individual tooth 13 of wedge-shaped configuration is described on the tip, root and flank side by radially oriented geometric lines 14, 15, 16 which meet at the intersection point P. The intersection point P is the common intersection point for all radially extending geometric lines of the toothed rim. The tooth angle β, twice the tooth flank angle α, is constant here over the entire radial extent of each individual tooth 13.

As can be seen, in particular, from FIG. 2a, the tooth flank is described by a plane which is inclined by the flank angle α with respect to the imaginary plane E. The plane E extends in the direction with a diminishing spacing A from two adjacent tooth gaps 17 on the circumferential side. The spacing becomes smaller as the rotational axis is approached. The plane E meets the planes Z1 which describe the gradient of the two flanks 18, 19 at P. The line 15 tapers toward P, starting from the highest tooth height H on the outside. Accordingly, the tooth height H decreases from the outside with a decreasing radial distance from the rotational axis 1a.

FIG. 3 shows the cross section through teeth 13 of the spline at the location having the highest tooth height H. The tooth gaps 17 of the face spline 9 are filled almost completely by the teeth of the mating spline 10, and the gaps of the mating spline 10 are filled almost completely by the teeth 13 of the face spline 9. An axial gap remains between the tooth tip 22 and the center 23 of the tooth gap. The planes Z1 which are common to one of the respective teeth 13 intersect one another on the tip side in the cut edge 20 and are each inclined by α with respect to E. The cut edges 20 are arranged with an identical pitch T with respect to one another. The planes Z1 intersect one another in the cut edge 21 on the root side. The cut edges 20 or 21 lie in the planes K and F. The theoretical tip height $H_{th}$ between the radial tip plane K and the radial root plane F is dependent on α in the case of a constant circumference U of the spline 9. The spacing H which is perpendicular in the figure and is axial at the face spline 9 is dependent on the radii tip radius R and root radius r in the case of an unchanged height $H_{th}$. R is greater than r (R>r). The playfree pairing of the splines 9 and 10 is therefore ensured, since a spacing between the tooth tip 22 and the center 23 of the tooth gap 17 always remains in the tooth gaps 17. Torques Md about the rotational axis 1*a* cause force components FR, FA and FU in the spline. FA is superimposed by a further axial force component which is caused by the prestress of the splines which are prestressed against one another by means of the threaded bolt 12.

LIST OF DESIGNATIONS

1 Wheel bearing arrangement
1*a* Rotational axis
2 Wheel hub
3 Rolling body
4 Vehicle flange
5 Flange
6 Inner ring
7 Collar
8 Section
9 Face spline
10 Mating spline
11 Drive element
12 Threaded bolt
13 Tooth
14 Geometric line
15 Geometric line
16 Geometric line
17 Tooth gap
18 Tooth flank
19 Tooth flank
20 Cut edge
21 Cut edge
22 Tooth tip
23 Center

The invention claimed is:

1. A face spline, comprising:
a toothed rim which has a plurality of teeth and which extends about a rotational axis in a circumferential direction on a wheel bearing arrangement for a driven wheel hub, the face spline engaging without play into a mating spline which opposes the face spline, and the teeth of the face spline being of wedge-shaped configuration and being described on a tip, a root and a flank side by radially oriented geometric lines of the face spline, the geometric lines meet centrally at a common point on the rotational axis and the teeth therefore extend in a radial direction toward the rotational axis, wherein flanks of the teeth of the face spline, which are provided for the engagement, are inclined at a flank angle greater than 20° and less than 30° with respect to a pitch plane which leads away from the rotational axis and divides each tooth symmetrically, wherein tooth gaps of the face spline are rounded concavely with at least one root radius between two adjacent flanks, wherein the tip of each tooth is rounded with at least one convex tip radius at least from one flank to another flank of each tooth, the tip radius being greater than the root radius, wherein a quotient from a greatest theoretical tooth height of each tooth and the tip radius corresponds at least to five and at most to nine, the greatest theoretical tooth height in the pitch plane being a greatest axial spacing between a first cut edge and a second cut edge, and two geometric planes which face one another intersect in the first cut edge and the second cut edge, and each of the geometric planes delimiting one of the flanks geometrically, the geometric planes of the flanks of each tooth intersecting in the first cut edge at a tip side of the tooth, and the geometric planes of two flanks, which lie opposite one another at one tooth gap, of mutually adjacent teeth intersecting in the second cut edge at a root side of the tooth.

2. The face spline as claimed in claim 1, wherein the face spline is configured in one piece with the wheel hub and has an overall cross-section with a lower resistance to torque deformation than other cross-sections of the material of the wheel hub.

3. A wheel bearing arrangement, comprising:
the face spline as claimed in claim 1, in which the mating spline is formed on a drive element which is clamped axially with the wheel hub, and the wheel hub and the drive element are clamped axially with prestress against one another by means of at least one threaded bolt,
wherein at least one expansion section of the threaded bolt has a lower resistance to torque deformation than any further arbitrary cross-section of the material of the wheel hub.

4. The wheel bearing arrangement as claimed in claim 3, wherein the face spline is configured on a collar of the wheel hub, the collar being formed radially to the outside from a hollow section of the wheel hub and, by way of the collar, at least one inner ring, which is seated on the wheel hub for at least one row of rolling bodies, is held at least axially on the wheel hub.

5. A face spline comprising:
a toothed rim which has a plurality of teeth and which extends about a rotational axis in a circumferential direction on a wheel bearing arrangement for a driven wheel hub, the face spline engaging without play into a mating spline which opposes the face spline, and the teeth of the face spline being of wedge-shaped configuration and being described on a tip, a root and a flank side by radially oriented geometric lines of the face spline, the geometric lines meet centrally at a common point on the rotational axis and the teeth therefore extend in a radial direction toward the rotational axis,
wherein flanks of the teeth of the face spline, which are provided for the engagement, are inclined at a flank angle greater than 20° and less than 30° with respect to a pitch plane which leads away from the rotational axis and divides each tooth symmetrically, wherein tooth gaps of the face spline are rounded concavely with at least one root radius between two adjacent flanks, wherein a quotient from a greatest theoretical tooth height of each tooth and the root radius corresponds at least to seven and at most to eleven, the theoretical tooth height in the pitch plane being a greatest axial spacing between a first cut edge and a second cut edge, and two geometric planes which face one another intersect in the first cut edge and the second cut edge, and each of the geometric planes delimiting one of the flanks geometrically, the geometric planes of the flanks of each tooth intersecting in the first cut edge at a tip side of the tooth, and the geometric planes of two flanks, which lie opposite one another at one tooth gap, of mutually adjacent teeth intersecting in the second cut edge at a root side of the tooth.

6. A face spline, comprising:
a toothed rim which has a plurality of teeth and which extends about a rotational axis in a circumferential direction on a wheel bearing arrangement for a driven wheel hub, the face spline engaging without play into a mating spline which opposes the face spline, and the teeth of the face spline being of wedge-shaped configuration and being described on a tip, a root and a flank side by radially oriented geometric lines of the face spline, the geometric lines meet centrally at a common point on the rotational axis and the teeth therefore extend in a radial direction toward the rotational axis, wherein flanks of the teeth of the face spline, which are provided for the engagement, are inclined at a flank angle greater than 20° and less than 30° with respect to a pitch plane which leads away from the rotational axis and divides each tooth symmetrically, wherein a quotient from a greatest theoretical tooth height of each tooth and a theoretical tooth root width corresponds at least to a value 0.9 and at most to a value 1.3, the greatest theoretical tooth height in the pitch plane being a greatest axial spacing between a first cut edge and a second cut edge, and two geometric planes which face one another intersect in the first cut edge and the second cut edge and each of the geometric planes delimiting one of the flanks geometrically, the geometric planes of the flanks of each tooth intersecting in the first cut edge at a tip side of the tooth, and the geometric planes of two flanks, which lie opposite one another at one tooth gap, of mutually adjacent teeth intersecting in the second cut edge at a root side of the tooth, and the theoretical tooth root width being a spacing between two mutually adjacent second cut edges.

* * * * *

UNITED STATES PATENT AND TRADEMARK OFFICE
CERTIFICATE OF CORRECTION

PATENT NO. : 8,444,322 B2  Page 1 of 1
APPLICATION NO. : 11/817590
DATED : May 21, 2013
INVENTOR(S) : Langer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this
Eighth Day of September, 2015

Michelle K. Lee
*Director of the United States Patent and Trademark Office*